(12) United States Patent
Ebrahimi Afrouzi (10) Patent No.: US 10,958,081 B1
(45) Date of Patent: Mar. 23, 2021

(54) BUILT IN ROBOTIC FLOOR CLEANING SYSTEM

(71) Applicant: Ali Ebrahimi Afrouzi, San Jose, CA (US)

(72) Inventor: Ali Ebrahimi Afrouzi, San Jose, CA (US)

(73) Assignee: AI Incorporated, Toronto (CA)

( * ) Notice: Subject to any disclaimer, the term of this patent is extended or adjusted under 35 U.S.C. 154(b) by 848 days.

(21) Appl. No.: 15/071,069

(22) Filed: Mar. 15, 2016

Related U.S. Application Data

(60) Provisional application No. 62/133,437, filed on Mar. 15, 2015.

(51) Int. Cl.
*H02J 7/00* (2006.01)

(52) U.S. Cl.
CPC .............. *H02J 7/00* (2013.01); *H02J 7/0045* (2013.01)

(58) Field of Classification Search
CPC .. H02J 7/025; H02J 50/12; H02J 50/60; H02J 50/70; H02J 50/90; H02J 50/80; H02J 50/50; H02J 5/005; H02J 17/00; H02J 50/05; H02J 7/35; H02J 50/40; H02J 7/0027; H02J 7/0029; H02J 7/0047; H02J 2007/0062; H02J 50/20; H02J 7/0055; H02J 13/00; H02J 2203/00; H02J 2310/00; H02J 2300/00; H02J 1/00; B60L 2240/72; B60L 53/53; B60L 3/00; B60L 8/00; B60L 9/00; B60L 15/00; B60L 58/00; Y02T 10/7005; Y02T 10/7088; Y02T 90/12; Y02T 90/00; A47L 2201/06; A47L 2201/022; A47L 9/2826; A47L 11/4011; A47L 2201/00; A47L 2401/00; A47L 2601/00; A47L 4/00; G05D 1/0219; G05D 17/00; G05D 21/00; G05D 5/00
USPC ................................................. 320/107–115
See application file for complete search history.

(56) References Cited

U.S. PATENT DOCUMENTS

| | | | |
|---|---|---|---|
| 8,374,721 B2* | 2/2013 | Halloran | G05D 1/0242 700/245 |
| 8,977,393 B1* | 3/2015 | Kohler | H02J 7/02 700/248 |
| 2005/0156562 A1* | 7/2005 | Cohen | A47L 9/2857 320/107 |
| 2009/0210211 A1* | 8/2009 | Honda | G06F 17/5022 703/14 |
| 2014/0184144 A1* | 7/2014 | Henricksen | B25J 9/0003 320/107 |

(Continued)

*Primary Examiner* — Binh C Tat (57) ABSTRACT

The present disclosure provides a built-in robotic floor cleaning system installed within the infrastructure of a workspace and a method for controlling and integrating such system in a workspace. The built-in robotic floor cleaning system comprises a robotic floor cleaning device and a docking station for charging the robotic floor cleaning device wherein the docking station is built into the infrastructure of the workspace. The system may further comprise a control panel integrated into the infrastructure of the workspace to deliver inputs from users and display outputs from the system. The system may further comprise a variety of types of confinement methods built into the infrastructure of the workspace to aid the robotic floor cleaning device in navigation. The system may also be provided with a virtual map of the environment during an initial set-up phase to assist with navigation.

20 Claims, 5 Drawing Sheets

(56) References Cited

U.S. PATENT DOCUMENTS

2015/0314453 A1* 11/2015 Witelson ................ B25J 11/00
320/108

* cited by examiner

BUILT IN ROBOTIC FLOOR CLEANING SYSTEM

CROSS-REFERENCE TO RELATED APPLICATIONS

This application claims the benefit of provisional patent application Ser. No. 62/133,437, filed Mar. 15, 2015 by the present inventor.

FIELD OF THE INVENTION

The present application relates to robotic devices, and more particularly, to robotic floor cleaning systems.

BACKGROUND OF INVENTION

The following is a tabulation of some prior art that presently appears relevant:

U.S. Patent Documents

| Pat. No. | Kind Code | Issue Date | Patentee |
| --- | --- | --- | --- |
| 6,883,201 | B2 | Apr. 26, 2005 | Irobot Corporation |
| 5,940,927 | A | Aug. 24, 1999 | Aktiebolaget Electrolux |
| 8,671,507 | B2 | Mar. 18, 2014 | Irobot Corporation |
| 7,474,941 | B2 | Jul. 24, 2003 | Samsung Gwangju Electronics Co., Ltd. |
| 7,937,800 | B2 | May 10, 2011 | Jason Yan |
| 8,209,053 | B2 | Jun. 26, 2012 | Samsung Electronics Co., Ltd. |

The present invention discloses a built-in robotic floor cleaning system installed within the infrastructure of a workspace and a method of integrating such system.

Robotic floor cleaning systems are becoming increasingly popular for use in homes, businesses and other locations. Nevertheless, there are major issues with existing robotic floor cleaning systems. These systems often require a large amount of time to set up and can have many separate parts that must be arranged around the area that is to be cleaned. Also, navigating these robotic systems in an efficient way is complicated and requires a range of control and navigation systems, as well as use of different confinement mechanisms, such as virtual or real boundaries that may have to be installed separately.

Confinement systems often take up a lot of space and may not be acceptable ergonomically and aesthetically for many users. Furthermore, installing such systems can be time consuming and expensive. A robotic cleaning system may have a docking station where the unit charges, a plurality of emitters that emit signals to form virtual boundaries, and other confinement mechanisms, such as light-absorbing floor coverings. Each of these subsystems must be placed at a desired location and sometimes must be moved and replaced. Furthermore, the plurality of separate physical parts of a robotic cleaning system renders the entire system less practical, as it has the effect of cluttering the very space that the system was intended to clean.

Another challenge that robotic cleaning systems face is generating a map of a work environment and localizing the robot within the map. Various methods and algorithms have been developed to attempt to solve that problem. However, these methods are generally designed to be used in unknown environments. That is, robotic devices self-generate maps of their environment. Relying on sensors to correctly identify free space and occupied space invokes an inherent amount of error, as sensors aren't one hundred percent accurate. Additionally, in systems that use mapping technology to generate virtual maps, the map-creation process requires a large amount of processing power and time.

SUMMARY

It is a goal of the present invention to provide a built-in robotic cleaning system wherein components of the system are installed within the infrastructure of a workspace.

It is a goal of the present invention to increase a robotic floor cleaning system's navigation accuracy.

It is a goal of the present invention to reduce the amount of work required to set up an efficient robotic floor cleaning system.

The aforementioned goals are achieved through a built-in robotic floor cleaning system comprising a robotic floor cleaning device and a docking station built into the infrastructure of a workspace for charging the robotic floor cleaning device. In some embodiments, the system further comprises a control panel and an input/output means also integrated into the infrastructure of the workspace to control the floor cleaning system and deliver inputs from users and display outputs from the system.

The system may further comprise a variety of types of confinement methods built into the infrastructure of the workspace to aid the robotic floor cleaning device in navigation and function.

The system may also be pre-programmed with a virtual map of the environment to assist with navigation. In some embodiments, a map of the work environment identifying free and occupied space is preloaded into the system.

BRIEF DESCRIPTION OF DRAWINGS

Non-limiting and non-exhaustive features of the present invention are described with reference to the following figures, wherein like reference numerals refer to like parts throughout the various figures.

DETAILED DESCRIPTION OF THE INVENTION

The present invention proposes a built-in robotic floor cleaning system. According to the proposed invention, the robotic floor cleaning system is built into the infrastructure of a home, office, or other workspace.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention Various embodiments are described herein below, including methods. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code.

Further, the invention may also cover apparatuses for practicing embodiments of the invention. Such apparatuses may include circuits, dedicated and/or programmable, to carry out tasks pertaining to embodiments of the invention. Examples of such apparatuses include a general-purpose computer and/or a dedicated computing device when appropriately programmed and may include a combination of a computer/computing device and dedicated/programmable circuits adapted for the various tasks pertaining to embodiments of the invention.

As understood herein, the term "robot" or "robotic device" may be defined generally to include one or more devices having communication, mobility, and/or processing elements. For example, a robot or robotic device may comprise a casing or shell, a chassis including a set of wheels, a motor to drive the set of wheels, a receiver to detect signals transmitted from, for example, a transmitting emitter, a processor, and/or controller that processes and/or controls motor and other robotic operations, network or wireless communications, power management, etc.

As understood herein, the term "emitter" may be defined generally to include one or more devices having the ability to send out a signal and includes any kind of transmitters and transceivers. Emitters may be omnidirectional or linear and may emit signals either continuously or at predefined intervals.

The term "signal" used herein, may refer to radio frequencies, sonar, light, infrared, ultraviolet, laser or any other type of wireless signal.

As understood herein, the term "docking station" may be defined generally to include a charging apparatus to charge a battery of a device, and, in some embodiments, peripheral devices or auxiliary features.

A built-in robotic floor cleaning system is provided by the present invention that comprises a robotic floor cleaning device used for preforming cleaning tasks, such as vacuuming, mopping, steam cleaning etc. on different surface types and a docking station built into the infrastructure of a workspace which connects to an electric power supply providing electric power to recharge a battery of the robotic floor cleaning device. The system may further comprise a built-in control panel to control the built-in robotic floor cleaning system and an input and output means through which a user provides inputs or receives outputs from the device. The input/output means may benefit from an interface that can communicate with a user.

It would be obvious to one skilled in the art that the control panel could be installed directly on the robotic device or be an external control panel. Also, an external docking station can be used concurrently with the built-in docking station.

This system can also benefit from different features that are used to confine, navigate or alter a movement path of the robotic floor cleaning device here known as "a movement confinement and alteration system". These systems can be also built-into the infrastructure of the workspace.

In some embodiments the system is supplied with a digital map of the workspace by an administrator during an initial set-up phase. Having the digital map of the work environment could overcome some difficulties associated with complicated mapping procedures, such as inaccuracy of sensors and the necessity for more processing power and more expensive features.

In some embodiments, the invention has a movement confinement and alteration system that comprises: a first localization signal emitter installed at a first strategic point within the infrastructure of the workspace emitting a first modulated signal corresponding to a particular location within the digital map of the work environment which, upon detection by the robotic floor cleaning device is identified by the robotic floor cleaning device to assist in localizing the robotic floor cleaning device within the digital map. It may also have subsequent localization signal emitters installed at subsequent strategic points within the infrastructure of the workspace where each localization signal emitter emits uniquely modulated signals corresponding to locations within the digital map.

In some embodiments, the invention has a different movement confinement and alteration system that comprises an auxiliary signal emitter built into the infrastructure of the workspace at a strategic point near the docking station. The auxiliary signal emitter emits modulated signals with navigational instructions to assist the robotic floor cleaning device in navigating to a specific location, such as the docking station.

One skilled in the art would appreciate that the invention can benefit from multiple movement confinement and alteration systems concurrently.

Figure 1:
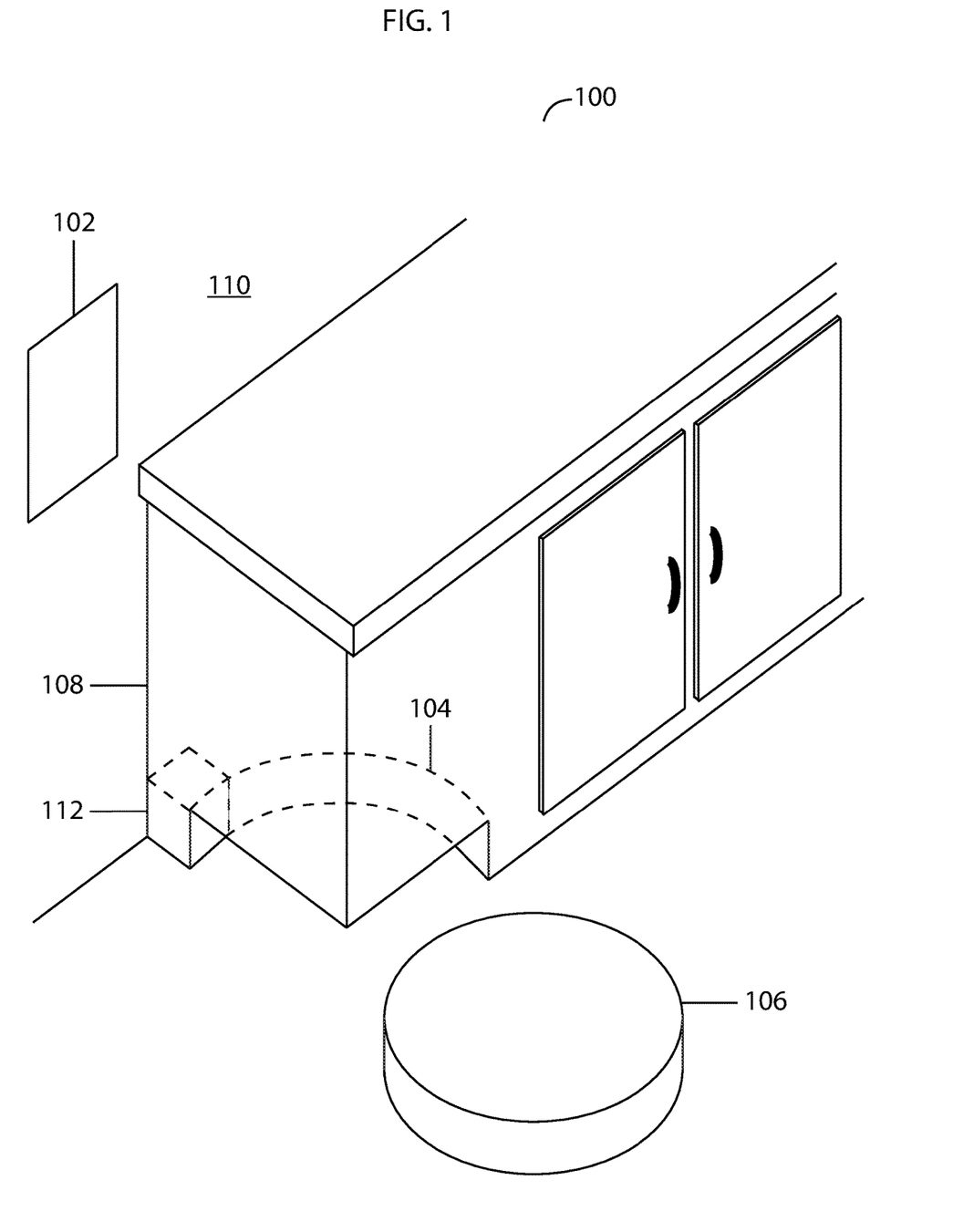
FIG. 1 illustrates a built-in robotic floor cleaning system embodying features of the present invention.

Referring to FIG. 1, a built-in robotic floor cleaning system 100 is illustrated. In this embodiment, a control panel 102 for controlling the robotic floor cleaning device 106 is built into the wall 110 and a docking station 104 is built into the cabinet 108. The docking station 104 connects to a power supply 112 to deliver power to the robotic floor cleaning device 106 while it is docked.

It will be obvious to one skilled in the art that the figures are only for illustration purposes and the placement of the docking station 104 and the control panel 102 is not limited and the docking station and control panel may be built into other parts of a workspace.

In some embodiments, a map of the layout of the work environment is provided to the system by an administrator during an initial set-up phase.

Figure 2:
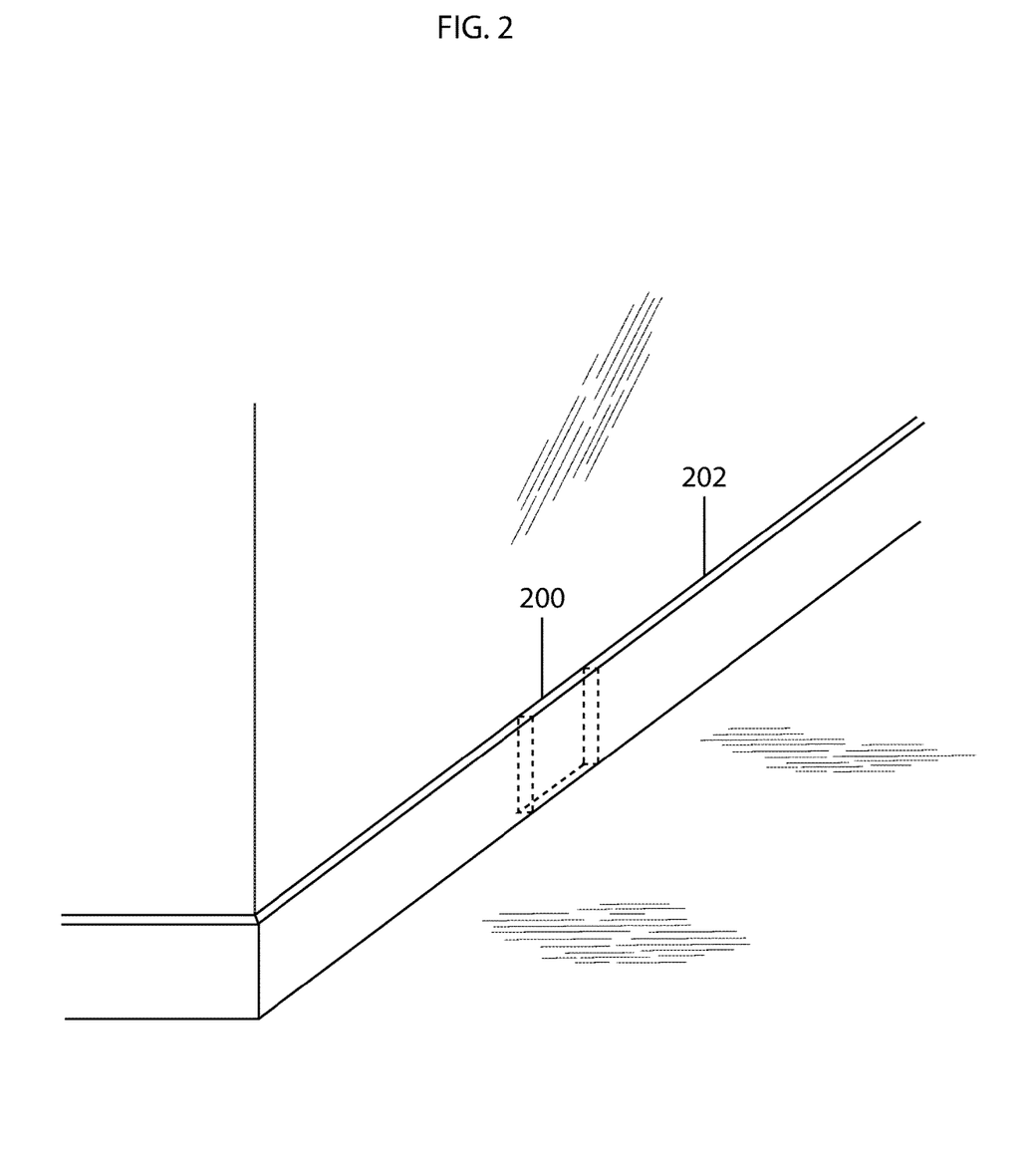
FIG. 2 illustrates a robotic floor cleaning system component built into a baseboard embodying features of the present invention.

Referring to FIG. 2, a confinement component for a robotic floor cleaning system is illustrated. In some embodiments, an emitter 200 is installed inside a baseboard 201. The emitter 200 operates from within the baseboard 201 by sending signals that can be received by the robotic floor cleaning device 106 when approaching the emitter 200 to help guide the device around the work area.

Figure 3:
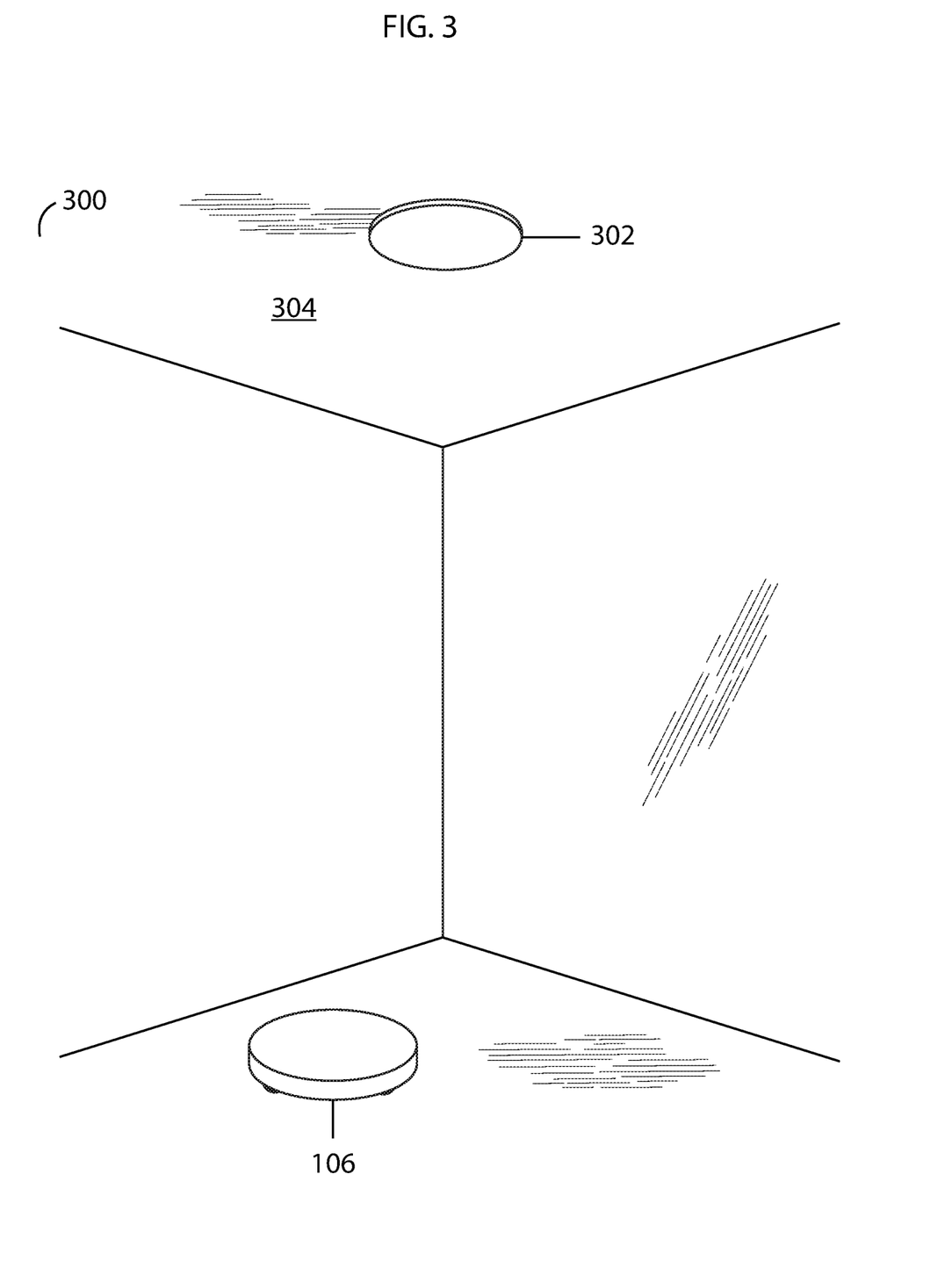
FIG. 3 illustrates a robotic floor cleaning system with a confinement mechanism built into the ceiling of a room embodying features of the present invention.

Referring to FIG. 3, another type of confinement component used in some embodiments of the invention is illustrated. In this instance, the signal emitter 302 is installed on or built into the ceiling 304 of room 300. The signal emitter sends signals to the robotic floor cleaning device 106 from this position.

Figure 4:
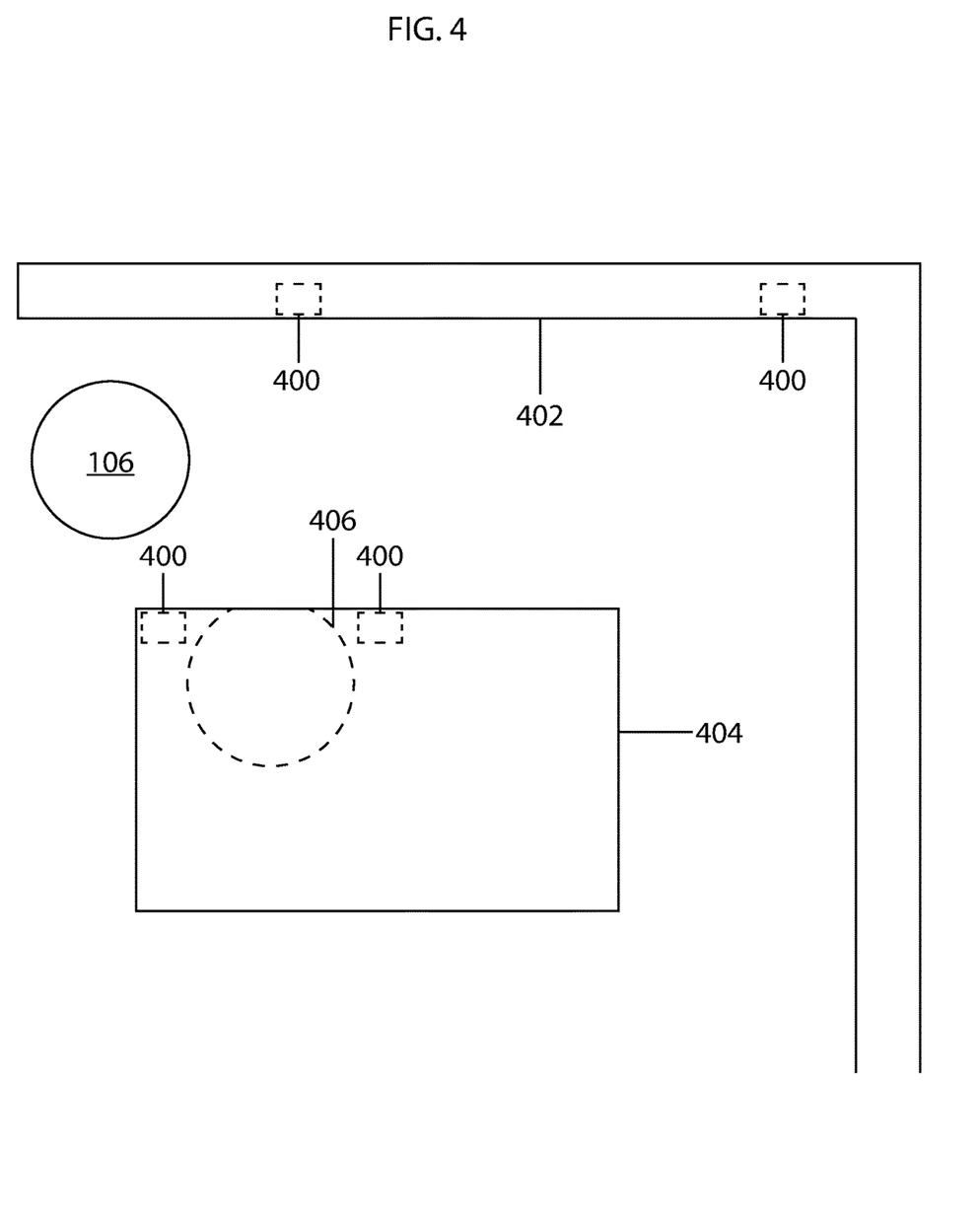
FIG. 4 illustrates an overhead view of a robotic floor cleaning system with a docking station and auxiliary signal emitters positioned within the infrastructure of the workspace at strategic points to guide the floor cleaning device embodying features of the present invention.

Referring to FIG. 4, an overhead view of a built in robotic floor cleaning system is illustrated. In the example shown, a number of auxiliary signal emitters 400 are installed within the wall 402 and cabinet 404. In some embodiments, auxiliary signal emitters may be used to aid a robotic floor cleaning device 106 in navigating to a docking station 401. Auxiliary signal emitters 400 send omnidirectional signals that are received by the robotic floor cleaning device 106 when it approaches, the signals containing movement instructions for the robotic device to follow.

Figure 5:
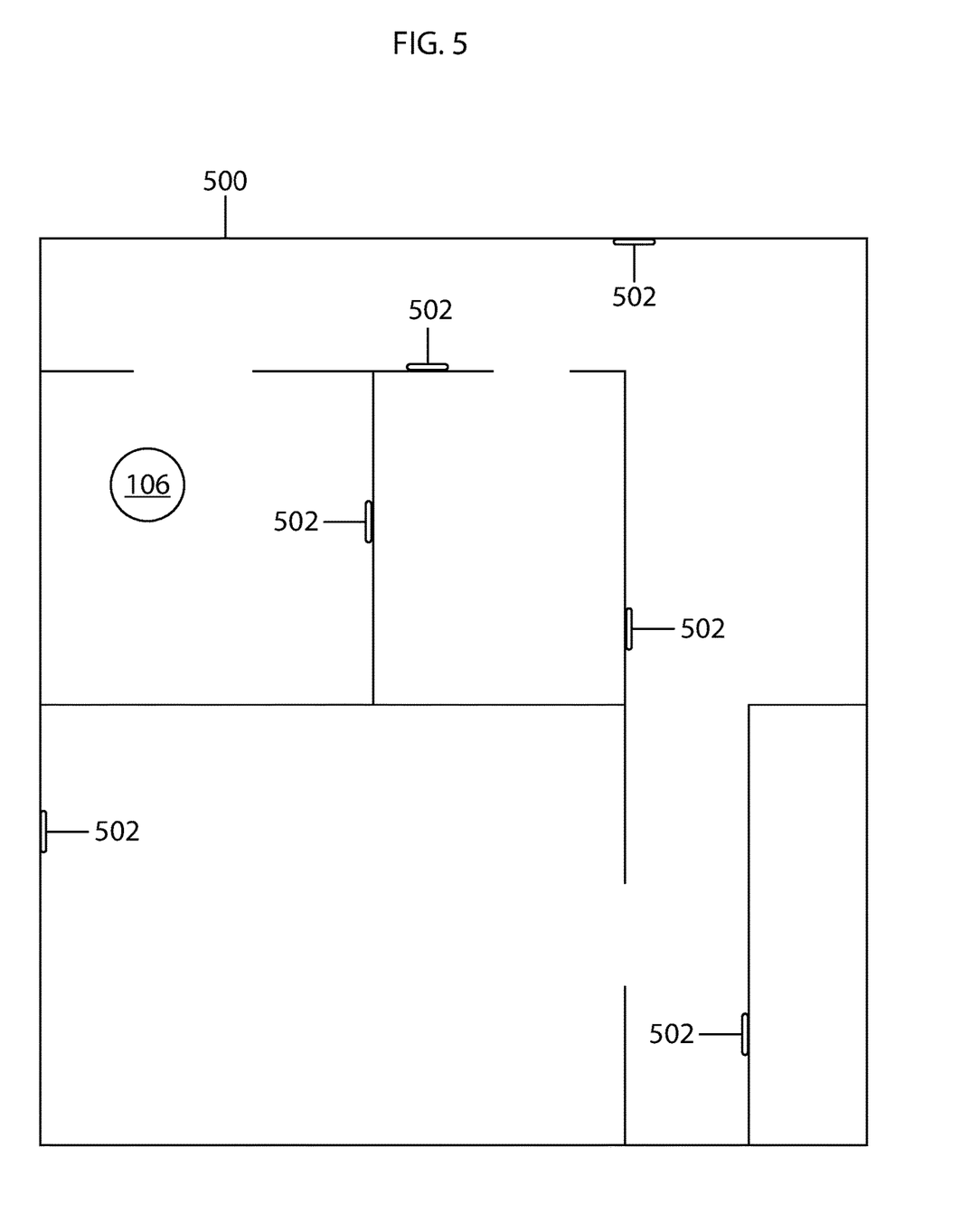
FIG. 5 illustrates an overhead view of robotic floor cleaning system with auxiliary signal emitters positioned within the infrastructure of the workspace at strategic points to guide the mobile floor cleaning device embodying features of the present invention.

Referring to FIG. 5, another type of movement alteration mechanism is illustrated. The lines 500 represent walls or obstacles of the workspace. Localizing emitters 501 are installed in or on the walls at strategic points. The locations of the localizing emitters correspond to points in the map provided to the system at installation. Each localizing emitter emits a uniquely modulated signal to distinguish itself from other localizing emitters. Upon detecting a localizing emitter 501, the robotic floor cleaning device 106 uses the frequency to identify the location of the emitter within the map and thereby localize itself within the map.

In some embodiments, the input/output means uses wireless signals to send and receive signals to and from remote devices, such as: remote controls or smartphones.

In some embodiments, an application could be installed on an internet-enabled device, such as a smartphone, a computer, a tablet, etc., to facilitate communication between a user and the control panel 102.

In some embodiments, systems to confine the robotic floor cleaning device within areas of the workspace are also built into the workspace. Such systems use emitters that emit signals to allow or disallow movement of the robotic floor cleaning device beyond certain points or linear boundaries identified by signals emitted from emitters installed in walls, baseboards, or other parts of workspaces.

In some embodiments, confinement subsystems such as these are equipped with battery compartments that open to allow a user to remove and replace batteries.

Other methods for controlling robot movement can also be pre-installed in workspaces. For example, barcodes that some robotic floor cleaning systems use to identify locations and boundaries may be pre-installed at specific points within a work environment.

In some embodiments with confinement systems, confinement systems are equipped with wireless signal emitters and receivers to send and receive data from the user through the control panel to configure the confinement systems.

In some embodiments with multiple confinement systems that emit signals, different types of signal emitters or different emitters may use different frequencies to distinguish between emitters or between types of emitters.

What is claimed is:

1. A built-in robotic floor cleaning system, comprising:
    a robotic floor cleaning device;
    a docking station which connects to an electric power supply providing electric power to recharge a battery of the robotic floor cleaning device, wherein the docking station is built into the infrastructure of a workspace;
    a control panel to control the built-in robotic floor cleaning system, wherein the control panel is positioned within the infrastructure of the workspace;
    an input and output means through which a user provides inputs to or receive outputs from the robotic floor cleaning system; and
    at least one auxiliary signal emitter that emits modulated signals with navigational instructions to assist the robotic floor cleaning device in navigating to a specific location, wherein the at least one auxiliary signal emitter is built into the infrastructure of the workspace at a strategic point near the specific location.

2. The system of claim 1 wherein the built-in robotic floor cleaning system is supplied with a digital map of the workspace by an administrator during an initial set-up phase.

3. The system of claim 1 further comprising a movement confinement and alteration system wherein the movement confinement and alteration system is built into the infrastructure of the workspace.

4. The system of claim 2 further comprising a localization signal emitter installed at a point within the infrastructure of the workspace emitting a modulated signal corresponding to a particular location within the digital map of the workspace.

5. The system of claim 1 wherein the robotic floor cleaning device uses a digital map of the workspace to navigate and wherein the map identifies occupied and unoccupied spaces.

6. The system of claim 1 further comprising:
    a control panel to control the built-in robotic floor cleaning system, wherein the built-in control panel is installed on the robotic floor cleaning device; and
    an input and output means through which a user provides inputs to or receive outputs from the robotic floor cleaning system.

7. The system of claim 1 wherein the robotic floor cleaning device comprises at least:
    a chassis;
    a set of wheels coupled to the chassis;
    a motor to drive at least the set of wheels;
    a controller to control the motor;
    a signal receiver to detect transmitted signals;
    a signal transmitter to transmit signals; and
    a processor.

8. The system of claim 1 further comprising at least one signal emitter.

9. The system of claim 8 wherein the robotic floor cleaning device uses signals emitted from the at least one signal emitter to align itself with the docking station when docking.

10. The system of claim 8 wherein signals emitted from the at least one signal emitter comprise movement instructions and wherein the robotic floor cleaning device executes the movement instructions upon receiving the signals.

11. The system of claim 8 wherein signals emitted from the at least one signal emitter create at least one virtual boundary within the workspace.

12. The system of claim 11 wherein the robotic floor cleaning device avoids crossing the at least one virtual boundary.

13. The system of claim 11 wherein a user determines a location of the at least one virtual boundary.

14. The system of claim 8 wherein at least two signal emitters of the at least one signal emitter emit signals with different frequencies.

15. The system of claim 8 wherein the at least one signal emitter emits signals continuously or at intervals.

16. The system of claim 1 wherein the input and output means comprises a remote device.

17. The system of claim 1 wherein the input and output means comprises an application installed on an internet-enabled device.

18. The system of claim 17 wherein the internet-enabled device is one or more of: a smartphone, a computer, and a tablet.

19. The system of claim 1 wherein the robotic floor cleaning device uses signals emitted from the at least one auxiliary signal emitter to align itself with the docking station when docking.

20. The system of claim 1 wherein the at least one auxiliary signal emitter emits signals continuously or at intervals.

* * * * *